tion file for complete search history.

(12) United States Patent
Simmons et al.

(10) Patent No.: US 9,383,847 B2
(45) Date of Patent: Jul. 5, 2016

(54) PORTABLE ELECTRONIC DEVICE INCLUDING TOUCH-SENSITIVE DISPLAY AND METHOD OF CONTROLLING SAME

(75) Inventors: Sean Bartholomew Simmons, Waterloo (CA); Nazih Almalki, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1070 days.

(21) Appl. No.: 12/578,036

(22) Filed: Oct. 13, 2009

(65) Prior Publication Data

US 2011/0084911 A1 Apr. 14, 2011

(51) Int. Cl.
G06F 3/041 (2006.01)

(52) U.S. Cl.
CPC ............ *G06F 3/0412* (2013.01); *G06F 3/0414* (2013.01)

(58) Field of Classification Search
USPC .................................................. 345/173–179
See application file for complete search history.

(56) References Cited

U.S. PATENT DOCUMENTS

| 5,854,625 | A | * | 12/1998 | Frisch et al. ................. | 345/173 |
| 6,995,752 | B2 | | 2/2006 | Lu | |
| 2006/0119586 | A1 | | 6/2006 | Grant et al. | |
| 2006/0197753 | A1 | | 9/2006 | Hotelling | |
| 2007/0236478 | A1 | * | 10/2007 | Geaghan et al. ............. | 345/173 |

FOREIGN PATENT DOCUMENTS

| GB | 2180342 A | 3/1987 |
| TW | 200404248 | 3/2004 |
| WO | 0235461 A1 | 5/2002 |
| WO | 03041006 A1 | 5/2003 |

OTHER PUBLICATIONS http://www.vissumo.com/index/php/en/technical-description published at least as early as Aug. 2009.
European Patent Application No. 09172897.2, Search Report dated Apr. 21, 2010.
Office Action dated Jan. 29, 2013, issued in respect of corresponding European Patent Application No. 09172897.2.
Office Action dated Mar. 27, 2013, issued in respect of corresponding Taiwan Patent Application No. 099127611.
Examination Report dated Jun. 28, 2013, issued in respect of corresponding European Patent Application No. 09172897.2.

* cited by examiner

*Primary Examiner* — Dennis Joseph
(74) *Attorney, Agent, or Firm* — Borden Ladner Gervais LLP; Geoffrey deKleine

(57) ABSTRACT

A method includes detecting first and second touches on the touch-sensitive display and determining a location of each of the first and second touches, determining, by a plurality of force sensors, reaction forces, for the first and second touches, and determining a respective applied force for each of the first and second touches based on the reaction forces and the locations of the first and second touches.

3 Claims, 5 Drawing Sheets ent
PORTABLE ELECTRONIC DEVICE INCLUDING TOUCH-SENSITIVE DISPLAY AND METHOD OF CONTROLLING SAME

FIELD OF TECHNOLOGY

The present disclosure relates to electronic devices, including but not limited to touch-sensitive displays.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed.

Improvements in devices with touch-sensitive displays are desirable.

DETAILED DESCRIPTION

Figure 1:
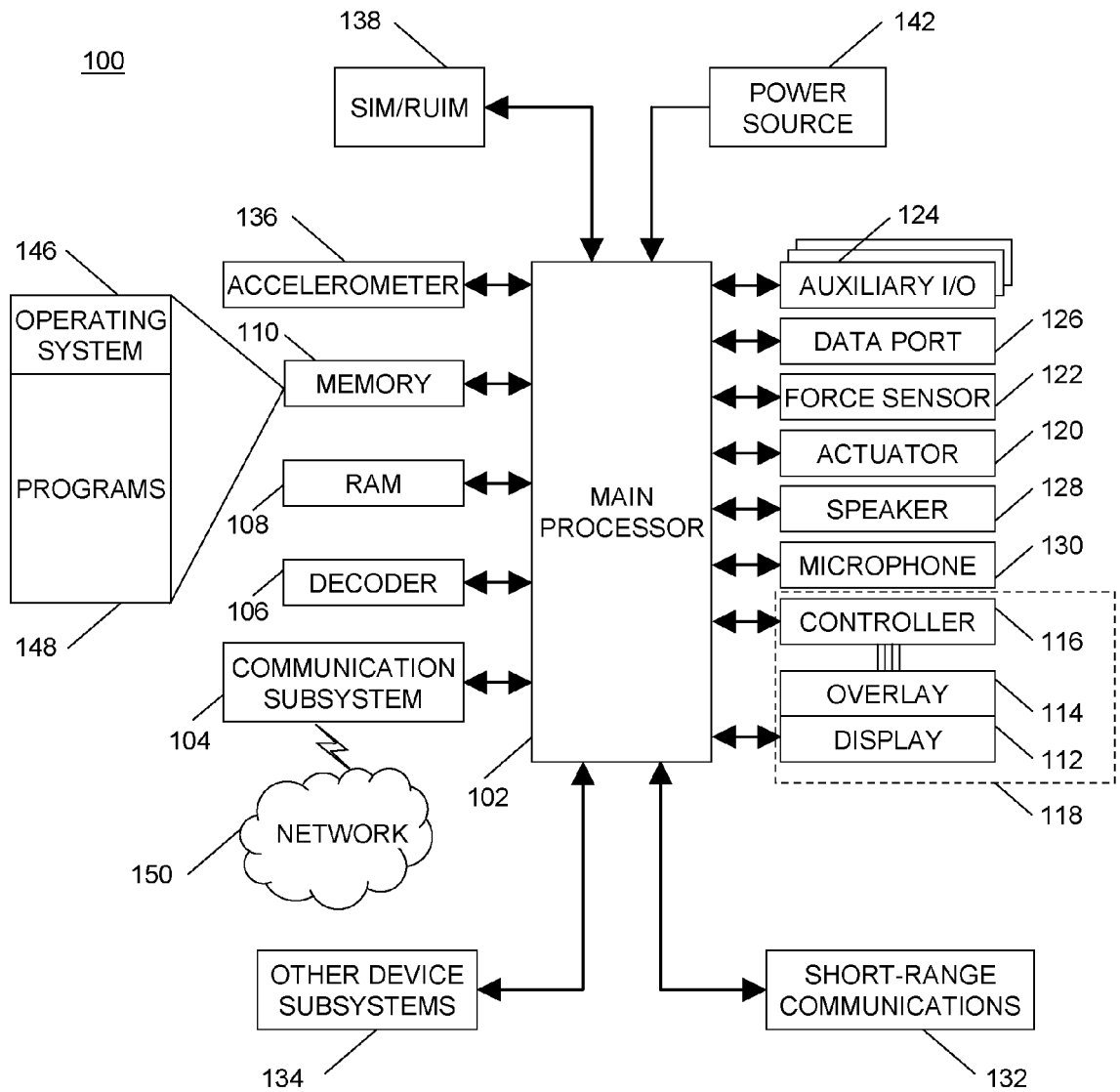
FIG. 1 is a block diagram of a portable electronic device in accordance with the present disclosure.

The following describes an electronic device and method of controlling the electronic device. The method includes detecting first and second touches on the touch-sensitive display and determining a location of each of the first and second touches, determining, by a plurality of force sensors, reaction forces, for the first and second touches, and determining a respective applied force for each of the first and second touches based on the reaction forces and the locations of the first and second touches.

For simplicity and clarity of illustration, reference numerals may be repeated among the figures to indicate corresponding or analogous elements. Numerous specific details are set forth to provide a thorough understanding of the embodiments described herein. The embodiments may be practiced without these specific details. In other instances, well-known methods, procedures, and components have not been described in detail so as not to obscure the embodiments described herein. The description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and dual-mode networks that support both voice and data communications. A power source 142, such as one or more rechargeable batteries or a port to another power supply, powers the portable electronic device 100.

The processor 102 interacts with other devices, such as a Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into the memory 110.

The portable electronic device 100 also includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, or surface acoustic wave (SAW) touch-sensitive display, as known in the art. A capacitive touch-sensitive display includes the display 112 and a capacitive touch-sensitive overlay 114. The overlay 114 may be an assembly of multiple layers in a stack including, for example, a substrate, LCD display 112, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118 and processed by the controller 116, for example, to determine a location of a touch. Touch location data may include a single point of contact, such as a point at or near a center of the area of contact, or the entire area of contact for further processing. The location of a touch detected on the touch-sensitive display 118 may include x and y components, e.g., horizontal and vertical with respect to one's view of the touch-sensitive display 118, respectively. For example, the x component may be determined by a signal generated from one touch sensor layer, and the y component may be determined by a signal generated from another touch sensor layer. A signal is provided to the controller 116 in response to detection of a suitable object, such as a finger, thumb, or other items, for example, a stylus, pen, or other pointer, depending on the nature of the touch-sensitive display 118. More than one simultaneous location of contact may occur and be detected.

Figure 2A:
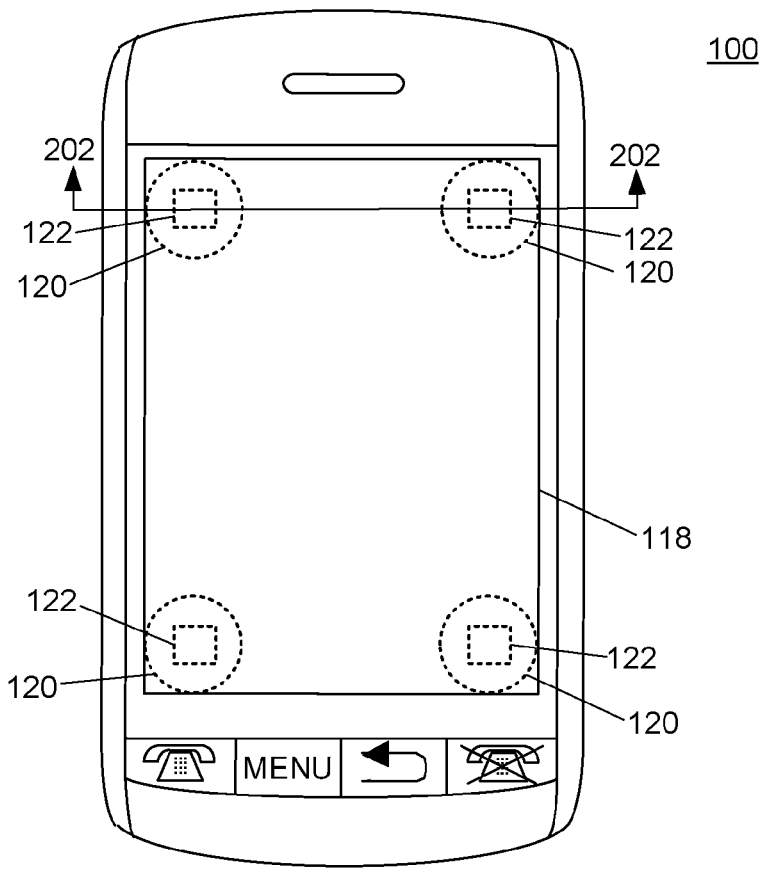
FIG. 2A is a front view of an example of a portable electronic device in accordance with the present disclosure.
Figure 2B:
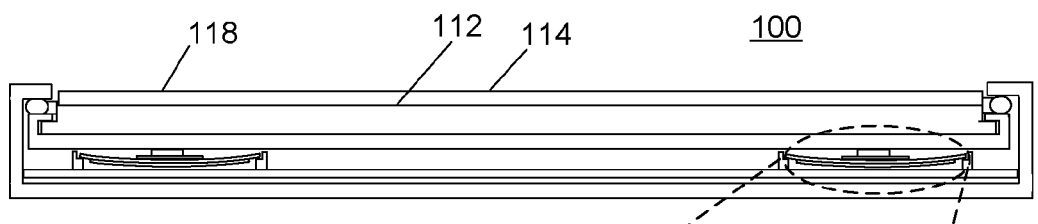
FIG. 2B is a sectional side view of the portable electronic device through the line 202 of FIG. 2A, in accordance with the present disclosure.
Figure 2B:
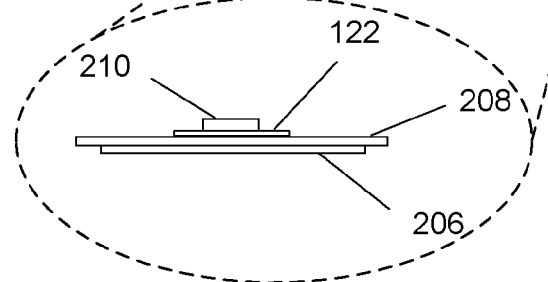

The actuator 120 may comprise one or more piezoelectric (piezo) actuators that provide tactile feedback. FIG. 2A is front view of an example of a portable electronic device 100. In the example shown in FIG. 2A, the actuator 120 comprises four piezo actuators 120, each located near a respective corner of the touch-sensitive display 118. FIG. 2B is a sectional side view of the portable electronic device 100 through the line 202 of FIG. 2A. Each piezo actuator 120 is supported within the portable electronic device 100 such that contraction of the piezo actuators 120 applies a force against the touch-sensitive display 118, opposing a force externally applied to the display 118. Each piezo actuator 120 includes a piezoelectric device, such as a piezoelectric ceramic disk 206, referred to herein as a piezoelectric disk 206, adhered to a metal substrate 208. An element 210 that is advantageously at least partially flexible and comprises, for example, hard rubber may be located between the disk 206 and the touch-sensitive display 118. The element 210 does not substantially dampen the force applied to or on the touch-sensitive display 118. In the present example, four force sensors 122 are utilized with each force sensor 122 located between an element 210 and the metal substrate 208. The force sensors are utilized to measure the reaction force at each of the force sensors 122 when an external force is applied to the overlay 114 of the touch-sensitive display 118. The metal substrate 208 bends when the piezoelectric disk 206 contracts diametrically due to build up of charge at the piezoelectric disk 206 or in response to an external force applied to the touch-sensitive display 118. The charge may be adjusted by varying the applied voltage or current, thereby controlling the force applied by the piezo actuators 120 on the touch-sensitive display 118. The charge on the piezo actuators 120 may be removed by a controlled discharge current that causes the piezoelectric disk 206 to expand diametrically, decreasing the force applied by the piezo actuators 120 on the touch-sensitive display 118. Absent an external force applied to the overlay 114 and absent a charge on the piezoelectric disk 206, the piezo actuator 120 may be slightly bent due to a mechanical preload.

Figure 3:
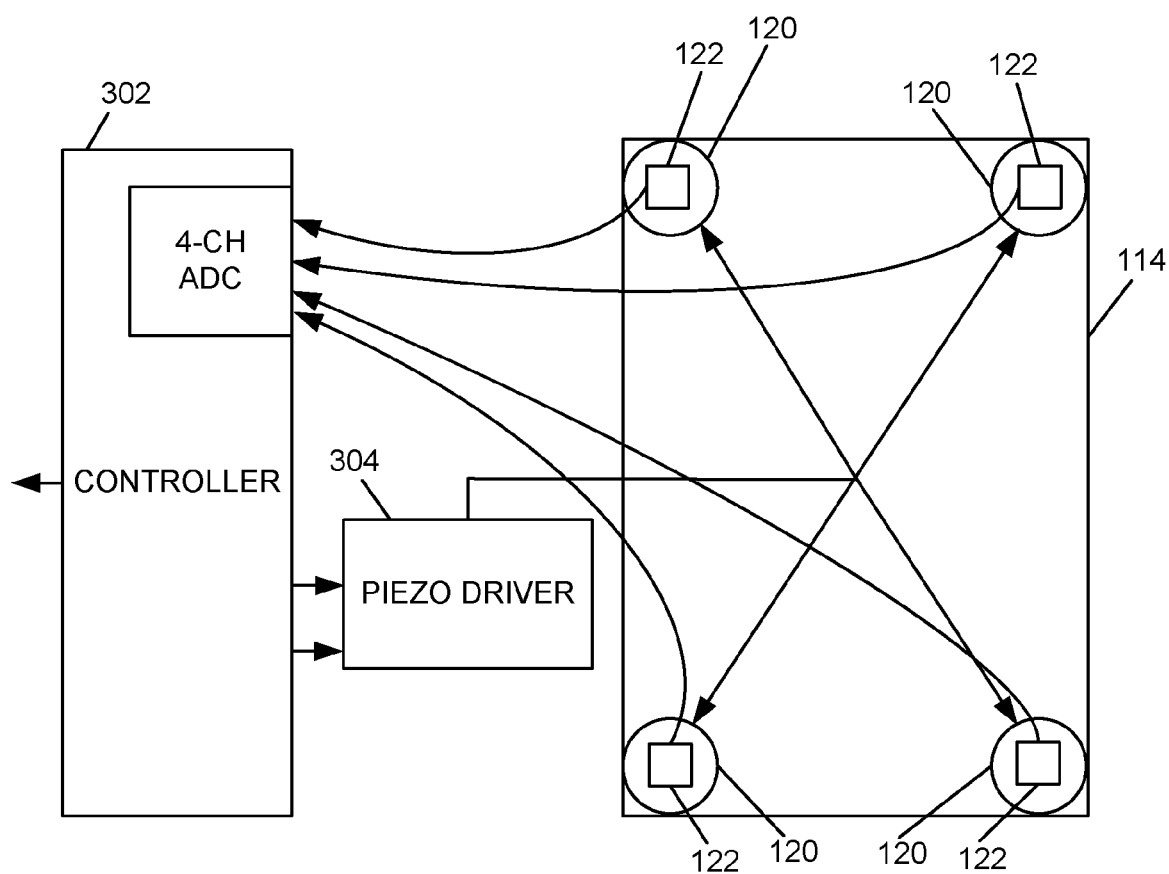
FIG. 3 is a functional block diagram showing components of the portable electronic device in accordance with the present disclosure.

FIG. 3 shows a functional block diagram of components of the portable electronic device 100. In this example, each force sensor 122 is connected to a controller 302, which includes an amplifier and analog-to-digital converter (ADC). The force sensors 122 act as force sensing resistors in an electrical circuit and therefore the resistance changes with force applied to the force sensors 122. As applied force on the touch-sensitive display 118 increases, the resistance decreases. This change is determined via the controller 116 for each of the force sensors 122, and with calibrated force sensors 122, with known gain and offset values, the corresponding value of the reaction force at each of the force sensors 122 is determined.

The piezo actuators 120 are connected to a piezo driver 304 that communicates with the controller 302. The controller 302 is also in communication with the main processor 102 of the portable electronic device 10 and may receive and provide signals to the main processor 102. The piezo driver 304 may optionally be embodied in drive circuitry between the controller 302 and the piezoelectric disks 312. The controller 302 controls the piezo driver 304 that controls the current to the piezoelectric disks 206 and thus controls the charge and the force applied by the piezo actuators 120 on the touch-sensitive display 118. Each of the piezoelectric disks 206 may be controlled substantially equally and concurrently. Optionally, the piezoelectric disks 206 may be controlled separately. In the example described below, collapse and release of a dome switch is simulated. Other switches, actuators, keys, and so forth may be simulated, or a non-simulated tactile feedback may be provided. When an applied force, on the touch-sensitive display 118, exceeds a threshold, the charge at the piezo actuators 120 is modulated to impart a force on the touch-sensitive display to simulate collapse of a dome switch. When the applied force, on the touch-sensitive display 118 falls below a low threshold, after actuation of the piezo actuators 120, the charge at the piezo actuators 120 is modulated to impart a force, by the piezo actuators 120, to simulate release of a dome switch.

Figure 4:
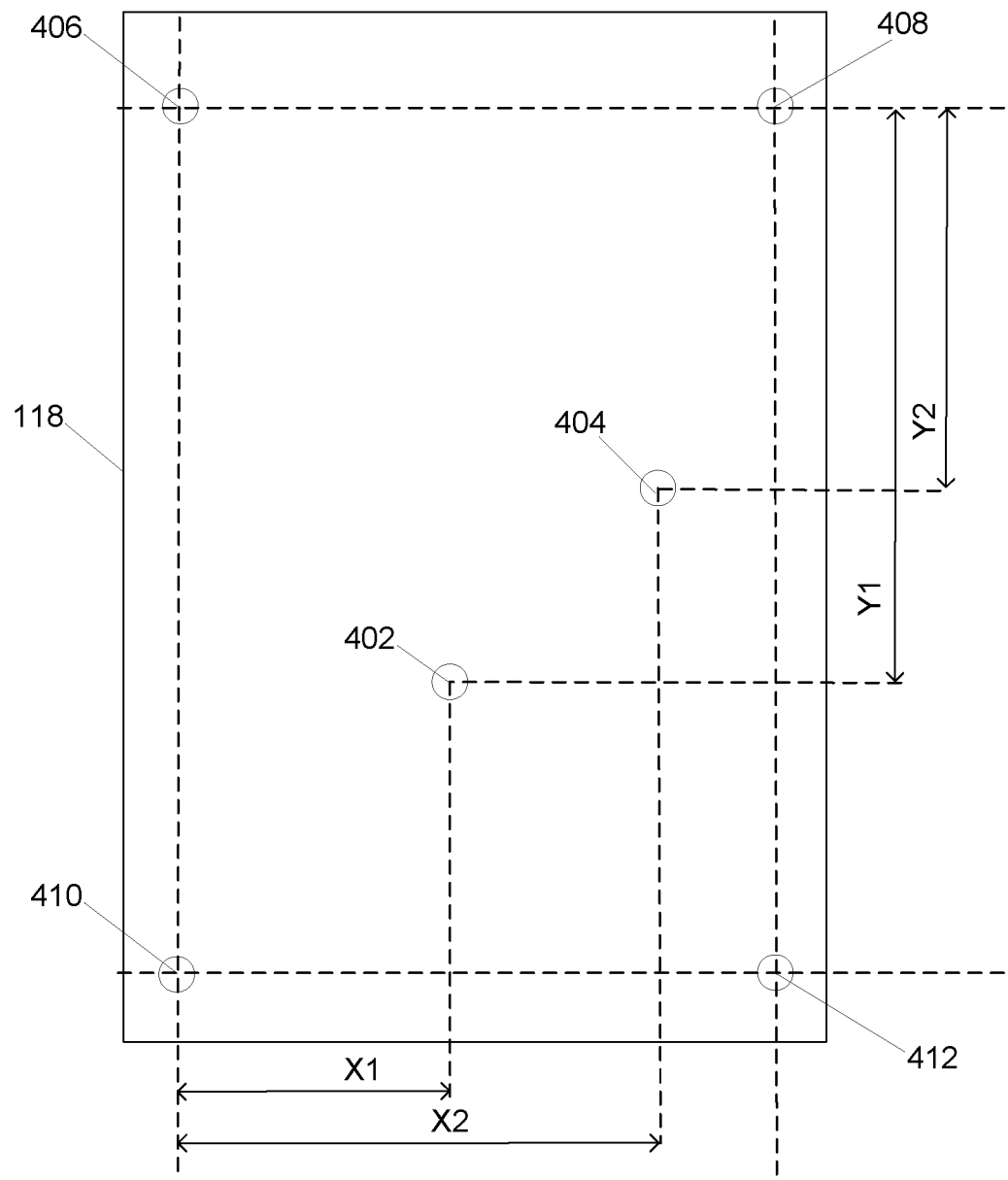
FIG. 4 illustrates an example of two touches on a touch-sensitive display in accordance with the present disclosure.

An example of two touches on a touch-sensitive display is illustrated in FIG. 4. The first touch 402 and second touch 404 are received and detected by the touch-sensitive display 118. The location of the first touch 402 and the location of the second touch are determined. The force at each of the four force sensors 122, at the positions 406, 408, 410, 412, is also determined. The respective forces at each of the two touches 402, 404 are determined by a best square fit. To determine the respective forces at each of the two touches 402, 404, the x component of the distance of the first touch 402 from the force sensor 122 at the position 406, referred to as X1 is determined. The y component of the distance of the first touch 402 from the force sensor 122 at the position 408, referred to as Y1 is determined. The x component of the distance of the second touch 404 from the force sensor 122 at the position 406, X2, is determined and the y component of the distance of the second touch 404 from the force sensor 122 at the position 408, Y2, is determined. The total distance between the force sensors 122 at the positions 406 and 408, which is the total X component difference, is known and the total distance between the force sensors 122 at the positions 406 and 410, which is the total Y component difference, is known.

A force distribution vector matrix is computed as $$DistMatrix = \begin{bmatrix} (SSX-X1)*(SSY-Y1) & (SSX-X2)*(SSY-Y2) \\ X1*(SSY-Y1) & (X2*(SSY-Y2) \\ (SSX-X1)*Y1 & (SSX-X2)*Y2 \\ X1*Y1 & X2*Y2 \end{bmatrix} \Big/ (SSX*SSY)$$

where:

DistMatrix is the force distribution vector matrix;

SSX is the spacing between the force sensors 122 at the positions 406, 408; and SSY is the spacing between the force sensors 122 at the positions 406, 410.

The values of X1, Y1, X2, Y2, SSX and SSY may be determined, in pixels, for example. Negative values of X1, Y1, X2 and Y2 may occur where a touch occurs near an edge of the touch-sensitive display 118, outside the rectangular area with corners located at the location of the force sensors 122.

A matrix inversion operation is performed on the force distribution vector matrix and the inverse matrix is multiplied by the forces determined at each of the force sensors to determine the force at each of the first and second touches 402, 404 as:

$$\begin{bmatrix} Forcetouch1 \\ Forcetouch2 \end{bmatrix} = Inverse(DistMatrix) * \begin{bmatrix} ForceF_1 \\ ForceF_2 \\ ForceF_3 \\ ForceF_4 \end{bmatrix},$$

where

Forcetouch1 is the applied force at the first touch 402;

Forcetouch2 is the applied force at the second touch 404;

Inverse (DistMatrix) is the inverse of the force distribution vector matrix;

$ForceF_1$ is the force determined at the force sensor 122, at the position 406;

$ForceF_2$ is the force determined at the force sensor 122, at the position 408;

$ForceF_3$ is the force determined at the force sensor 122, at the position 410; and $ForceF_4$ is the force determined at the force sensor 122, at the position 412.

Figure 5:
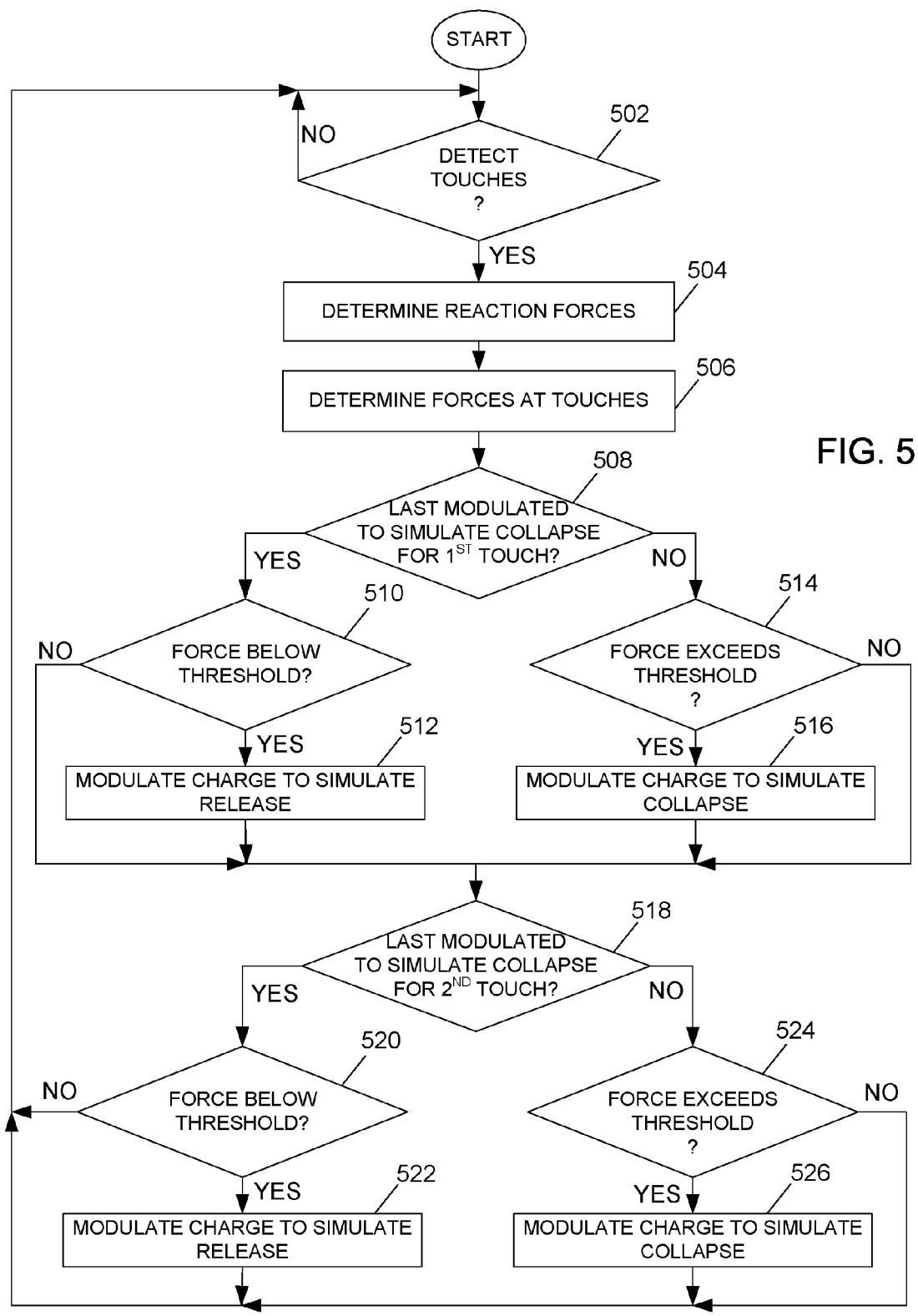
FIG. 5 is a flowchart illustrating a method of controlling an electronic device in accordance with the present disclosure.

A flowchart illustrating a method of controlling an electronic device is shown in FIG. 5. The method is advantageously performed by the processor 102 and the controller 116 performing stored instructions from a computer-readable medium. Coding of software for carrying out such a method is within the scope of a person of ordinary skill in the art given the present description.

When touches are detected 502, the location of touch on the touch-sensitive display 118 is determined. The forces are determined 504 based on signals from the force sensors 122 and the forces at each location of touch are determined 506 based on a best square fit as described above. For the first touch, a determination is made 508 whether or not the charge at the piezo actuator was last modulated to simulate collapse. When a determination is made 508 that the charge at the piezo actuators 120 was last modulated to simulate collapse for the first touch, a determination is made 510 whether the force of the first touch is below the low threshold and, if so, the charge at the piezo actuators 120 is modulated 512 to simulate release of the dome switch. If not, the process continues at 504. When a determination is made 508 that the charge at the piezo actuators 120 was not last modulated to simulate collapse for the first touch, a determination is made 514 whether the force of the first touch is above a threshold and, if so, the charge at the piezo actuators 120 is modulated 516 to simulate collapse of the dome switch.

For the second touch, a determination is made 518 whether or not the charge at the piezo actuator was last modulated to simulate collapse. When a determination is made 518 that the charge at the piezo actuators 120 was last modulated to simulate collapse for the second touch, a determination is made 520 whether the force of the second touch is below the low threshold and, if so, the charge at the piezo actuators 120 is modulated 522 to simulate release of the dome switch. If not, the process continues at 502. When a determination is made 518 that the charge at the piezo actuators 120 was not last modulated to simulate collapse of a dome switch for the second touch, a determination is made 524 whether the force of the second touch is above a threshold and, if so, the charge at the piezo actuators 120 is modulated 526 to simulate collapse of the dome switch.

A method includes detecting first and second touches on the touch-sensitive display and determining a location of each of the first and second touches, determining, by a plurality of force sensors, reaction forces, for the first and second touches, and determining a respective applied force for each of the first and second touches based on the reaction forces and the locations of the first and second touches.

A computer-readable medium has computer-readable code executable by at least one processor of a portable electronic device to perform the above method.

An electronic device includes a touch-sensitive display, a plurality of force sensors, each configured to determine a reaction force resulting from first and second touches on the touch-sensitive display, and a processor operably coupled to the force sensors and the touch-sensitive display to determine a respective applied force for each of the first and second touches based on the reaction forces and locations of the first and second touches.

The force at each of two touches that overlap in time may be determined, facilitating determination of the touch at which a greater force is applied. Selections on the touch-sensitive display may be made based on the determination of the touch at which greater force is applied. A determination may also be made whether or not to provide tactile feedback based on the force applied at each touch. The actuators may be controlled to simulate collapse of the dome switch more than once before the simulation of release of the dome switch. This tactile feedback provides a confirmation of selection, facilitating the reduction of entry errors and device use time.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
    detecting first and second touches on the touch-sensitive display and determining a location of each of the first and second touches;
    determining, by a plurality of force sensors, reaction forces for the first and second touches;
    determining a respective applied force for each of the first and second touches based on the reaction forces and the locations of the first and second touches;
    determining a force distribution vector matrix comprising determining $$DistMatrix = \begin{bmatrix} (SSX-X1)*(SSY-Y1) & (SSX-X2)*(SSY-Y2) \\ X1*(SSY-Y1) & X2*(SSY-Y2) \\ (SSX-X1)*Y1 & (SSX-X2)*Y2 \\ X1*Y1 & X2*Y2 \end{bmatrix} \bigg/ (SSX*SSY)$$

where:
    DistMatrix is the force distribution vector matrix;
    X1 is the x component of distance between the first touch and force sensors;
    X2 is the x component of distance between the second touch and force sensors;
    Y1 is the y component of distance between the first touch and force sensors;
    Y2 is the y component of distance between the second touch and force sensors;
    SSX is the spacing between the force sensors in an x direction; and
    SSY is the spacing between the force sensors in a y direction.

2. The method according to claim 1, wherein determining a respective applied force comprises performing a matrix inversion on the force distribution vector matrix to provide an inverse matrix.

3. The method according to claim 1, wherein determining a respective applied force comprises multiplying the inverse matrix by each the reaction forces determined from signals from the four force sensors to provide the force at each of the touches.

* * * * *